(No Model.)
J. HOBBS.
PROCESS OF MANUFACTURING ARTIFICIAL BUTTER.
No. 271,240. Patented Jan. 30, 1883.
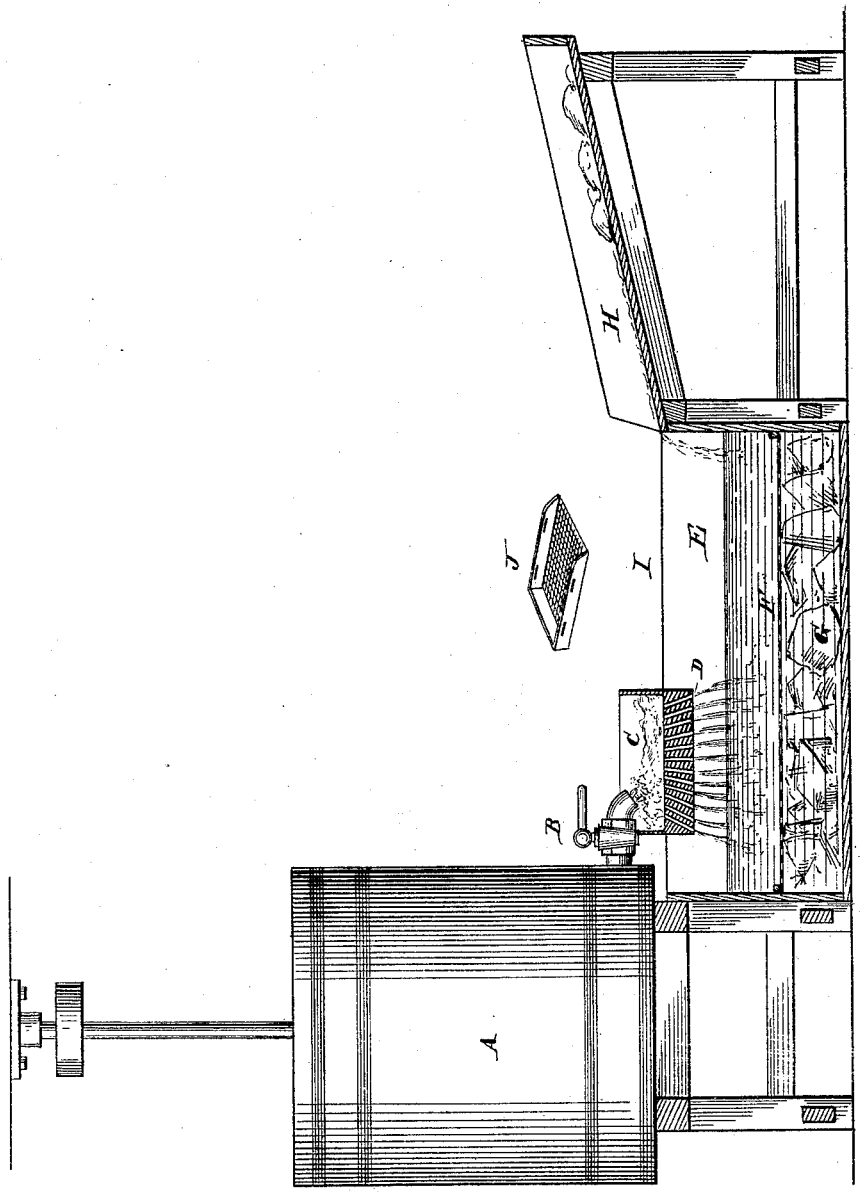
Attests
Wm H. Sonneborn
John M. O'Brien
Inventor
John Hobbs
By his atty
John R. Bennett

United States Patent Office.

JOHN HOBBS, OF BOSTON, MASSACHUSETTS.

PROCESS OF MANUFACTURING ARTIFICIAL BUTTER.

SPECIFICATION forming part of Letters Patent No. 271,240, dated January 30, 1883.

Application filed December 12, 1882. (No model.)

*To all whom it may concern:*

Be it known that I, JOHN HOBBS, of the city of Boston, in the county of Suffolk and State of Massachusetts, have invented an Improved Process of Manufacturing Artificial Butter, of which the following is a specification.

My invention has reference to the manufacture of artificial butter, or what is generally known as "oleomargarine butter;" and it consists in causing the emulsion formed from the mixture of oleomargarine, milk, &c., by the aid of churning action, to pass in small streams into the cooling-liquid, the said liquid being kept free from floating ice, whereby the said emulsion is quickly solidified; further, in removing said solidified emulsion or artificial butter by means of a ladle pervious to water, and depositing it upon an inclined surface, from which the cooling-liquid may drain off, as more fully set forth in the following specification and accompanying drawing, which forms part thereof.

Heretofore it has been customary to cause the emulsion to flow in one large stream into a box or tank of broken ice, and which during the influx of the emulsion was constantly moved about by shovels to present fresh surfaces of the ice to the liquid artificial butter it is designed to solidify. After the emulsion or butter has been solidified it is shoveled out, accompanied by the ice with which it is mixed, and laid upon large tables, when the ice is picked out by hand, leaving the butter in condition to be put up into prints or packed in the usual manner.

The main objections to the above process are that the emulsion is not quickly cooled, the cooling substance is lost after being once used, and great labor and loss of valuable time is the result.

The object of my invention is to obviate the above objectionable features by reducing the time required for cooling, preventing any waste of the cooling-liquid, having no separation to make after the emulsion has been solidified and deposited upon the draining-table, and by the general reduction of time and labor necessary to accomplish by my process what has heretofore been accomplished by the process specified above.

In the drawing is shown apparatus in which to carry on my process.

A is the usual churn.

B is the tap or valve by which the emulsion is run off from the churn.

C is the dividing tank or tray into which the emulsion from the churn is discharged, and by which it is divided into a series of small streams which run into the cold water in the tank F. The dividing-tank C may be made in various ways, one of which is shown, in which the bottom is provided with a series of gradually-diverging apertures, D, the object being to cause the small streams of emulsion to separately fall or run into the water.

The cooling-tank I is provided with a grating or screen, F, dividing said tank into two compartments, one, G, in which the ice is kept, and one, E, containing clear water, and into which the small streams of emulsion find their way.

H is the receiving or draining table, which is set at an incline, with its lower end arranged to cause any waste water to run back into the tank I after draining from the butter, which has been removed from the chamber or compartment E of tank by the ladle J, which is provided with a perforated bottom to allow the free passage of water.

The process is carried on as follows: The oleomargarine, milk, &c., is placed in the churn A, and is then converted into an emulsion. When sufficiently churned the emulsion is run off by tap B into the tank or tray C, when it is subdivided into a number of small streams, which fall or run into the ice-cold water in the chamber or compartment E of the tank I, where it is quickly cooled and solidified without coming in contact with ice, as was heretofore the case. Upon solidifying it is scooped up by the ladle J and deposited upon the draining-table H, when the adhering water is allowed to drain back into the tank or cooler I, thereby losing none of the refrigerating-liquid. The artificial butter is then packed or made into prints in the usual manner.

If the emulsion were run into the cold water in a single large stream, it would not solidify throughout, but would have the outer surface chilled, while the center remained soft.

I do not consider that spraying the emulsion, in place of causing it to run in small streams, would in any manner evade my invention, as my improvement comprehends, broadly, reduc-